(12) United States Patent
Lee et al.

(10) Patent No.: US 12,414,582 B2
(45) Date of Patent: Sep. 16, 2025

(54) JUICER

(71) Applicant: ANGEL CO., LTD., Busan-si (KR)

(72) Inventors: Mun Hyon Lee, Nonsan-si (KR); Kwang Hui Lee, Busan-si (KR)

(73) Assignee: ANGEL CO., LTD., Busan-si (KR)

( * ) Notice: Subject to any disclaimer, the term of this patent is extended or adjusted under 35 U.S.C. 154(b) by 339 days.

(21) Appl. No.: 16/899,601

(22) Filed: Jun. 12, 2020

(65) Prior Publication Data

US 2021/0274827 A1 Sep. 9, 2021

(30) Foreign Application Priority Data

Mar. 5, 2020 (KR) .................. 10-2020-0027696

(51) Int. Cl.
- *A23N 1/02* (2006.01)
- *A47J 19/02* (2006.01)
- *B02C 18/24* (2006.01)
- *B02C 23/10* (2006.01)

(52) U.S. Cl.
CPC .............. *A23N 1/02* (2013.01); *A47J 19/025* (2013.01); *B02C 18/24* (2013.01); *B02C 23/10* (2013.01)

(58) Field of Classification Search
CPC . A23N 1/02; A47J 19/025; A47J 19/06; A47J 19/027; B02C 18/24; B02C 23/10
USPC .......................................................... 99/510
See application file for complete search history.

(56) References Cited

U.S. PATENT DOCUMENTS

| 5,396,836 | A  | * | 3/1995 | Kim ...................... | B30B 11/241 241/101.2 |
| 8,863,656 | B2 | * | 10/2014 | Trovinger ................ | A23N 1/02 100/145 |
| 10,182,589 | B2 | * | 1/2019 | Lee .......................... | A23N 1/00 |
| 2007/0133342 | A1 | * | 6/2007 | Gili ........................ | A47J 43/06 366/129 |
| 2007/0269564 | A1 | * | 11/2007 | Bertocchi ................ | A23L 2/04 426/489 |
| 2008/0066630 | A1 | * | 3/2008 | Siu ........................ | A47J 43/082 99/510 |
| 2009/0057235 | A1 | * | 3/2009 | Sugaya ................ | C02F 11/147 210/709 |

(Continued)

FOREIGN PATENT DOCUMENTS

| KR | 10-0334309 B1 | | 5/2002 |
| WO | WO2013069828 | * | 5/2013 |

OTHER PUBLICATIONS

CN 204133101 (Year: 2023).*

(Continued)

*Primary Examiner* — Elizabeth M Kerr
*Assistant Examiner* — Keith Brian Assante
(74) *Attorney, Agent, or Firm* — Insight Law Group, PLLC; Seung Lee

(57) ABSTRACT

The present disclosure relates to a juicer with improved safety, and particularly, includes a motor housing, a drive part including a motor which is provided inside the motor housing, and a roller part which is detachably coupled to extend forward from the motor housing, and is provided therein to be rotatably driven by the drive force transferred from the drive part, in which the drive part and the roller part are attached and detached by the normal and reverse rotation of the motor, thereby greatly improving safety of the juicer.

4 Claims, 9 Drawing Sheets

(56) References Cited

U.S. PATENT DOCUMENTS

| | | | | |
|---|---|---|---|---|
| 2013/0160658 A1* | 6/2013 | Torrisi | ................. | A23N 1/02 |
| | | | | 99/511 |
| 2014/0245906 A1* | 9/2014 | Lee | ................. | A23N 1/00 |
| | | | | 99/510 |
| 2016/0243186 A1* | 8/2016 | Mandeau | ................. | A23L 33/105 |
| 2017/0367398 A1* | 12/2017 | Cui | ................. | A23N 1/02 |
| 2021/0039893 A1* | 2/2021 | Pettersson | ................. | B30B 9/3096 |
| 2021/0337767 A1* | 11/2021 | Trottier | ................. | G09B 7/00 |

OTHER PUBLICATIONS

EP2777449 (Year: 2023).*
KR1020120127705 (Year: 2023).*
CN203436142 (Year: 2023).*
KR19950026408 (Year: 2023).*

* cited by examiner

JUICER

CROSS-REFERENCE TO RELATED APPLICATIONS

This application claims priority to Korean Patent Application No. 10-2020-0027696, filed on Mar. 5, 2020, the disclosure of which is incorporated by reference herein in its entirety.

TECHNICAL FIELD

The present disclosure relates to a juicer, and more particularly, to a juicer with improved safety.

BACKGROUND ART

Generally, a juicer such as a juicer for green vegetable juice extracts juice by compressing various kinds of vegetables, fruits, or the like and mainly uses a centrifugal separation method and a pair gear method.

The centrifugal separation method is suitable for a juicer which extracts fruit juice, but has problems in that, even if a vegetable, which is much in fiber and less in moisture, is cut and rotated at a considerably high speed in order to extract juice, a juice extraction rate is not high and the residual heavy metal is discharged.

On the other hand, the pair gear method has a configuration of extracting cutting and juice by compressing the material or simultaneously cutting and compressing the material, and has advantages in that the juice extraction rate is several times higher than that of the centrifugal separation method and the residual heavy metal is not eluted together with the green vegetable juice, such that the juicer using the pair gear method occupies most of the current juicer market demand.

The juicer using the pair gear method includes a pair of grinding parts having a helical gear form and a pair of transfer parts having an Archimedes spiral form, and is configured by accommodating the grinding parts and the transfer parts within a housing in which a juice net is formed and then coupling the housing with a drive part through a fastening part.

The pair of grinding parts is driven by the drive part to transfer a material to the transfer parts while rotating with being engaged with each other, cutting, grinding, and juicing the put material, and the transfer parts compress the ground material while transferring the ground material, thereby extracting the juice.

However, the conventional juicer has a problem in that the grinding part and the drive part of the juicer are coupled to each other to drive the juicer uniformly, thereby causing a risk of safety accidents due to the unexpected operations of the grinding part and the drive part.

RELATED ART DOCUMENT

Patent Document (Patent Document 1) Korean Patent No. 10-0334309

DISCLOSURE

Technical Problem

The present disclosure is intended to solve the above problem, and an object of the present disclosure is to provide a juicer with improved safety, in which a drive part and a roller part of a juicer are automatically attached and detached by the normal and reverse rotation of a motor, thereby preventing safety accidents.

Technical Solution

An embodiment of a juicer with improved safety according to the present disclosure may include:
  a motor housing;
  a drive part including a motor which is provided inside the motor housing; and
  a roller part which is detachably coupled to extend forward from the motor housing, and is provided therein to be rotatably driven by a driving force which is transferred from the drive part, and
  the drive part and the roller part may be mutually attached and detached by the normal and reverse rotation of the motor.

In an embodiment of the present disclosure, the drive part may be provided with a sensor operating part, and
  a roller part housing including the roller part may include
    a sensor part composed of a sensor which is operated by a change in a distance from the sensor operating part.

In an embodiment of the present disclosure, the roller part may be coupled to the drive part when the motor is rotated normally, and the roller part may be separated from the drive part when the motor is rotated reversely.

In an embodiment of the present disclosure, the motor may be automatically rotated normally if a fastening completion signal is received through a controller after the roller part is fastened to the drive part.

In an embodiment of the present disclosure, the motor may be automatically rotated reversely if a juicing completion signal is received through the controller after the driving of the roller part is terminated.

In an embodiment of the present disclosure, the roller part may include:
  a first gear roller which is connected to a rotary shaft of the driver part and gradually decreases in outer diameter in a discharge direction of sludge; and
  a second gear roller which is connected to a fixed shaft of the drive part and gradually decreases in outer diameter in the discharge direction of the sludge.

In an embodiment of the present disclosure, the juicer with the improved safety may further include sludge compressing force generator which generates a compressing force to sludge before a juicing material transferred between the outer surface of the roller part and the inner surface of the main housing is finally discharged.

In an embodiment of the present disclosure, the sludge compressing force generator may be provided at the end of the main housing, and is provided to be formed in a rim direction of a stepped part to give a resistance against a transferring force of the sludge, the stepped part being formed to be stepped between the sludge compressing force generator and an extension protruding from the front end of the roller part.

In an embodiment of the present disclosure, the motor may be a normal and reverse rotation motor, and the motor may be operated with a smaller output upon normal rotation than that upon reverse rotation.

Advantageous Effects

According to an embodiment of the juicer with improved safety according to the present disclosure, it is possible to improve safety because a drive part and a roller part of a juicer are automatically attached and detached by the normal and reverse rotation of a motor, thereby preventing safety accidents.

BEST MODE

Figure 1:
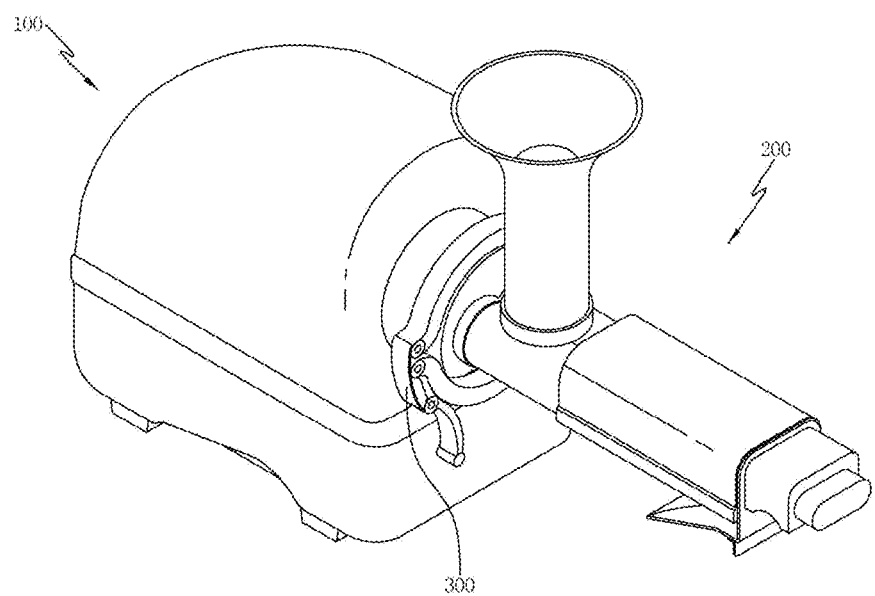
FIG. 1 is a perspective diagram illustrating an embodiment of a juicer with improved safety according to the present disclosure.

Hereinafter, an embodiment of a juicer with improved juicing performance according to the present disclosure will be described in detail with reference to the accompanying drawings.

In adding reference numerals to the components of each drawing, it should be noted that the same components are denoted by the same reference numerals as possible even though they are illustrated in different drawings. Further, in describing embodiments of the present disclosure, if it is determined that the detailed description of the related publicly-known configuration or function disturbs the understanding of the embodiments of the present disclosure, the detailed description thereof will be omitted.

In describing the components of the embodiments of the present disclosure, terms such as first, second, A, B, (a), and (b) may be used. These terms are only to distinguish a component from another component, and the nature, order, sequence, and the like of the corresponding component are not limited by the terms. Further, unless otherwise defined, all terms used herein, including technical or scientific terms, have the same meaning as commonly understood by those skilled in the art to which the present disclosure pertains. Terms such as those defined in the commonly used dictionaries should be construed as having meanings consistent with the meanings in the context of the related art, and shall not be construed as ideal or excessively formal meanings unless expressly defined in this application.

Figure 2:
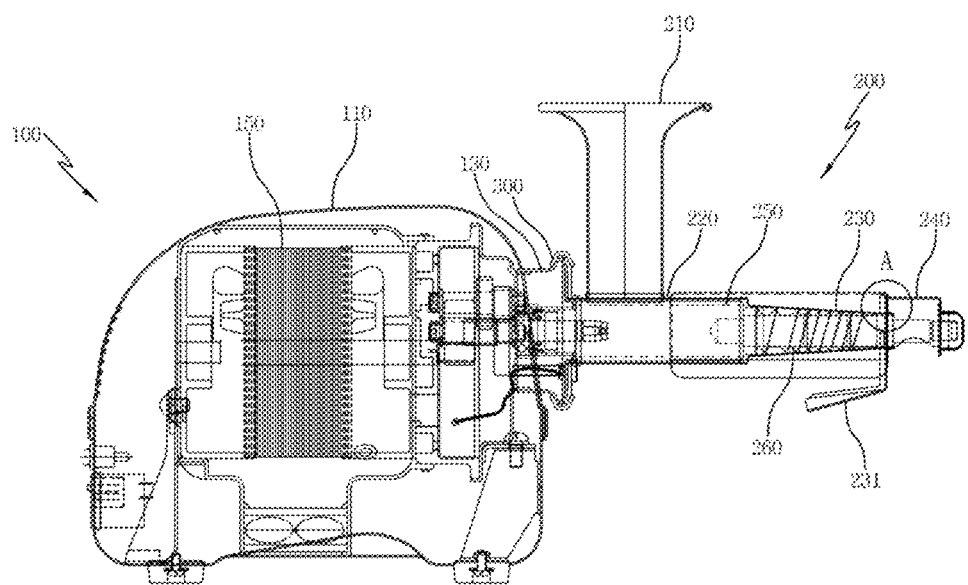
FIG. 2 is a vertical cross-section diagram of FIG. 1.
Figure 3:
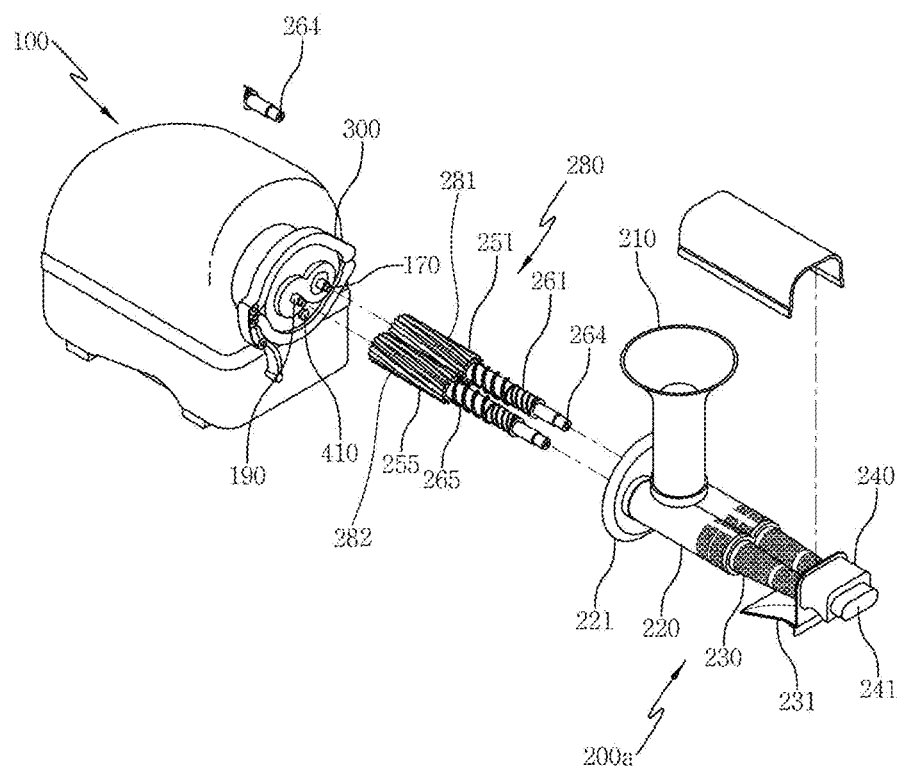
FIG. 3 is an exploded perspective diagram of FIG. 1.

FIG. 1 is a perspective diagram illustrating an embodiment of a juicer with improved juicing performance according to the present disclosure, FIG. 2 is a vertical cross-sectional diagram of FIG. 1, and FIG. 3 is an exploded perspective diagram of FIG. 1.

Hereinafter, in order to clearly understand the present disclosure, the description will be made by defining a horizontal direction of FIG. 2 as a "longitudinal direction", a left direction of FIG. 2 as a rear side, a right direction of FIG. 2 as a front side, a vertical direction of FIG. 2 as the top and the bottom, and a surface (paper) direction of FIG. 2 as a "width direction".

As illustrated in FIGS. 1 to 3, an embodiment of the juicer with improved juicing performance according to the present disclosure includes a drive part 100 and a juicing part 200.

The drive part 100 serves to drive the juicing part 200, and to provide a driving force so as to drive the juicing part 200, into which a material such as a vegetable or a fruit (hereinafter, referred to as "juicing material") is put, to grind and press the juicing material, thereby extracting the juice. The juicing part 200 includes a substantial juicing space where the juicing material is juiced while being put and the residual material is discharged to the outside in the form of sludge. The drive part 100 and the juicing part 200 may be firmly, detachably coupled by a fastening part 300 to be described later.

As illustrated in FIGS. 1 to 3, the drive part 100 may be configured to include a motor housing 110 which has a motor 150 provided therein, and has a hollow first connecting part 130 which protrudes forward and whose end increases and then decreases in diameter forward in the longitudinal direction, a rotary shaft 170 which rotates with one end connected to the motor 150 and the other end protruding in the longitudinal direction through the first connecting part 130, and a fixed shaft 190 which is provided to protrude from the first connecting part 130 in parallel with the rotary shaft 170. The rotary shaft 170 may be connected to the motor 150 through a speed reducer not illustrated.

The front end of the first connecting part 130 having a plate shape has an occluded structure with the protruding central portion. The protruding central portion has a form in which parts of two circular arcs overlap each other in the width direction, the fixed shaft 190 may be formed to protrude from the center of the circular arc at one side in the width direction, and the rotary shaft 170 may protrude through the center of the circular arc at the other side in the width direction.

As illustrated in FIGS. 1 to 3, the juicing part 200 may be composed of the roller part 280 which is rotatably connected to the drive part 100, and a hollow main housing 200a which accommodates the roller part 280 and is coupled to the motor housing 110 of the drive part 100.

The roller part 280 may include a grinding roller part 250, and a juicing roller part 260 which is connected to the front of the grinding roller part 250 and extends to decrease in diameter forward. The roller part 280 serves to grind the juicing material between the outer circumferential surface of the roller part 280 and the inner surface of the main housing 200a while being accommodated in the main housing 200a to rotate, and to press and juice the ground juicing material to transfer the material.

Here, the roller part 280 may be attached and detached to and from the drive part 100 automatically or manually by the normal and reverse rotation of the motor 150, which will be described in more detail with reference to the drawings below.

As illustrated in FIGS. 2 and 3, the grinding roller part 250 may have a grinding blade formed on the outer circumferential surface thereof, and include a first grinding roller 251 which is axially coupled to rotate integrally with the rotary shaft 170, and a second grinding roller 255 which is rotatably coupled to the fixed shaft 190.

The rotary shaft 170 may have a spline shape on the outer circumferential surface thereof or a polygonal cross section, and may be formed with a concave groove having a polygonal cross section so that the rotary shaft 170 may be inserted into the center of the rear end of the first grinding roller 251 or engaged with a spline.

The fixed shaft 190 may be formed to have a circular cross section shape, and formed with a concave groove having a circular cross section so that the fixed shaft 190 is inserted into and rotatably supported by the second grinding roller 255, and the second grinding roller 255 may idle by being rotatably supported by the fixed shaft 190. The first grinding roller 251 and the second grinding roller 255 may have a protrusion which protrudes forward or may be formed with a concave groove in the front surface thereof.

The grinding blades formed on the outer circumferential surfaces of the first grinding roller 251 and the second grinding roller 255 are provided to have a gear shape (preferably, a helical gear shape) to be engaged with each other, such that when the first grinding roller 251 coupled to the rotary shaft 170 rotates integrally with the rotary shaft 170, the second grinding roller 255 coupled to the fixed shaft 190 so as to idle by the engaged grinding blade may also rotate together.

Further, the juicing material is transferred forward while being ground and juiced by the grinding blades engaged with each other to rotate. When viewed from the front to the rear in FIG. 3, the first grinding roller 251 inserted into the rotary shaft 170 rotates counterclockwise, and the second grinding roller 255 rotates clockwise by the first grinding roller 251, such that the juicing material put from the top toward the first grinding roller 251 and the second grinding roller 255 is transferred while being ground by the grinding blades engaged with each other to rotate. At this time, the grinding blades formed on the outer circumferential surfaces of the first grinding roller 251 and the second grinding roller 255 and engaged with each other have a helical gear form and form a substantially 'V' shape forward when viewed from the top, such that the put juicing material is transferred forward while being ground by the grinding blades. The put juicing material is preferably ground and quickly transferred forward by forming a lead angle of the grinding blade to be smaller than 30 degrees.

As illustrated in FIGS. 2 and 3, the juicing roller part 260 may include a first juicing roller 261 and a second juicing roller 265 which are formed with protrusions spirally protruding from the outer circumferential surfaces thereof.

The first juicing roller 261 may be formed integrally at the front end of the first grinding roller 251, and the second juicing roller 265 may be formed integrally at the front end of the second grinding roller 255. As described above, in an embodiment of the juicer with improved juicing performance according to the present disclosure, the roller part of the juicing part 200 configured to juice the juicing material substantially may be provided in a pair gear method having two gears: one gear composed of the first grinding roller 251 and the first juicing roller 261 and one gear composed of the second grinding roller 255 and the second juicing roller 265.

Hereinafter, a configuration in which the first juicing roller 261 is coupled to the first grinding roller 251 to rotate integrally, and the second juicing roller 265 is coupled to the second grinding roller 255 to rotate integrally will be described.

Further, a configuration of the grinding roller part 250 and the juicing roller part 260 connected to the rotary shaft 170 of the drive part 100, among the components of the roller part 280, will be referred to as a first gear roller 281, and a configuration of the grinding roller part 250 and the juicing roller part 260 connected to the fixed shaft 190 of the drive part 100, among the components of the roller part 280, will be referred to as a second gear roller 282.

The first grinding roller 251 and the second grinding roller 255 may have protrusions which protrude forward, or may be concavely formed with grooves so that the first juicing roller 261 and the second juicing roller 265 are coupled thereto, respectively. The first juicing roller 261 and the second juicing roller 265 may be formed at the rear of the first grinding roller 251 and the second grinding roller 252 with grooves into which the protrusions provided on the first grinding roller 251 and the second grinding roller 255 are inserted, or may have the protrusions which are inserted into the concave grooves formed on the fronts of the first grinding roller 251 and the second grinding roller 255 and may be coupled to the first grinding roller 251 and the second grinding roller 255, respectively. At this time, the first grinding roller 251 and the first juicing roller 261 are coupled to each other in a forcibly fitting manner to rotate integrally, and the second grinding roller 255 and the second juicing roller 265 are coupled to each other in a forcibly fitting manner to rotate integrally. Of course, as described above, the first juicing roller 261 may also be formed integrally with the first grinding roller 251, and the second juicing roller 265 may also be formed integrally with the second grinding roller 255.

As illustrated in FIGS. 2 and 3, the first juicing roller 261 and the second juicing roller 265 of the juicing roller part 260 are formed to have a tapered shape in which outer circumferential surfaces 266 decrease in diameter (outer diameter) toward the front thereof. A spiral protrusion may be formed on each of the outer circumferential surfaces of the first juicing roller 261 and the second juicing roller 265.

Each of the front ends of the first juicing roller 261 of the first gear roller 281 and the second juicing roller 265 of the second gear roller 282 is not formed with the aforementioned spiral protrusion and may be further formed with an extension 264 including a stepped part 284 which is formed with a stepped surface with a relatively decreased diameter. The end of the extension 264 is rotatably supported by a support through hole (with no reference numeral) formed in an accommodating part 241 of a discharge housing 240 to be described later.

Figure 4:
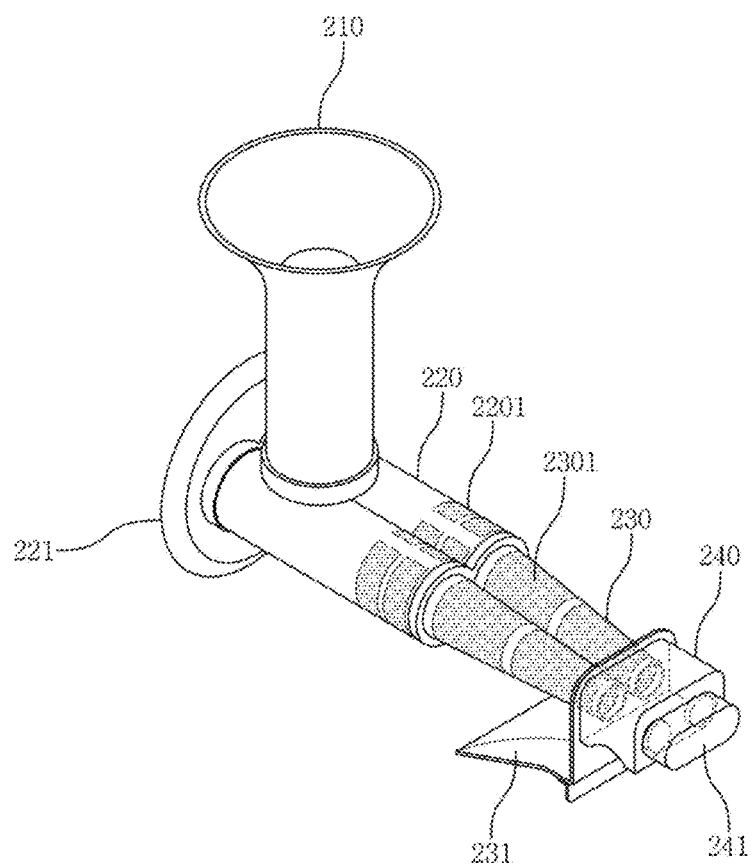
FIG. 4 is a perspective diagram illustrating a housing among components illustrated in FIG. 1.
Figure 5:
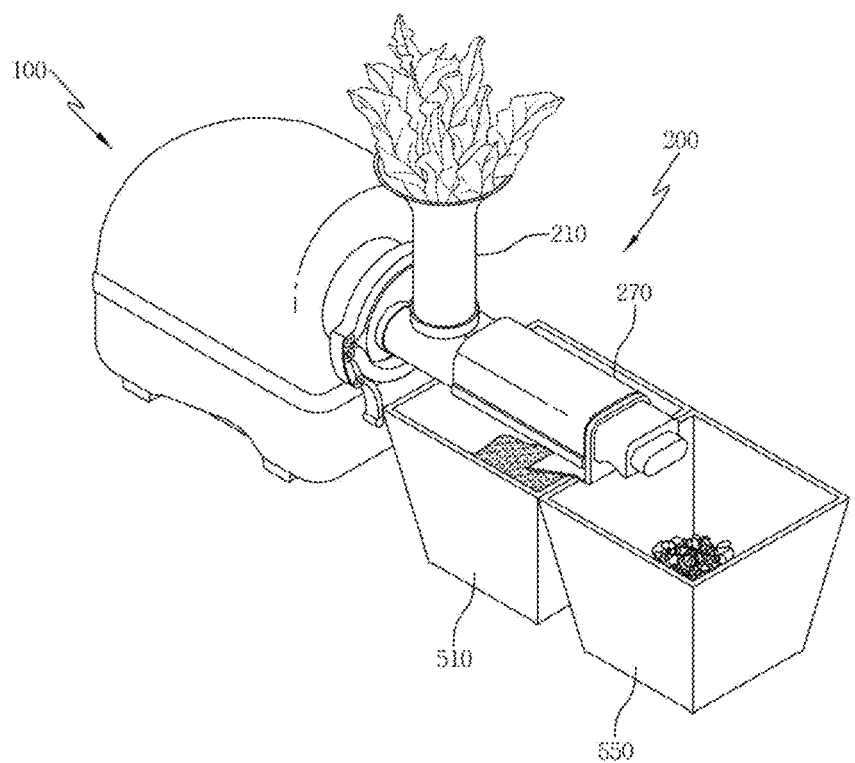
FIG. 5 is n external perspective diagram illustrating a juicing state using the juicer with improved safety according to the present disclosure.

FIG. 4 is a perspective diagram illustrating the main housing among the components illustrated in FIG. 1, and FIG. 5 is an external perspective diagram illustrating a juicing state using the juicer with improved juicing performance according to the present disclosure.

As illustrated in FIGS. 2 to 4, the main housing 200a may be composed of a hollow grinding housing part 220, and a hollow juicing housing part 230 which is branched from the grinding housing part 220 to extend to be tapered to decrease in diameter forward in the longitudinal direction.

The cross section of the grinding housing part 220 has a form in which parts of two circular arcs overlap each other so that the grinding blades of the first grinding roller 251 and the second grinding roller 255 may be inserted while being engaged with each other. A hollow hopper part 210, which is formed to extend upward to put the juicing material into the grinding housing part 220, may be provided at the top of the grinding housing part 220, and the grinding housing part 220 of the portion where the hopper part 210 is provided is formed with a through hole so that the hopper part 210 and the grinding housing part 220 may communicate with each other.

As illustrated in FIG. 4, a first juicing hole 2201, which is a plurality of fine through holes, may be formed in the grinding housing part 220 in front of the hopper part 210.

When the juicing material is put into the hopper part 210, the juicing material is transferred forward while being ground by the grinding blades of the first grinding roller 251 and the second grinding roller 255 which are engaged with each other to rotate, and a part of the juice flowing out from the juicing material while the juicing material is ground may be first discharged through the first juicing hole 2201.

The juicing housing part 230 may be formed with a second juicing hole 2301, which is a plurality of fine through holes, and a plate-shaped juicing solution discharge guider 231 is positioned to be inclined downward under the juicing housing part 230. The juicing solution discharge guider 231 is formed integrally in the discharge housing 240 to be described later, and serves to guide the juicing solution of the juicing material juiced by the juicing part 200 to be discharged downward.

As described above, the juicing material transferred forward by the first grinding roller 251 and the second grinding roller 255 is primarily discharged as a juicing solution through the first juicing hole 2201, and the juicing material which is not completely juiced is secondarily discharged as a juicing solution through the second juicing hole 2301 while being transferred toward the first juicing roller 261 and the second juicing roller 265 to be juiced. Here, before processing the secondary discharge, the compressing force may be generated in the sludge before the juicing material, which is transferred between the outer surface of the second juicing roller and the inner surface of the main housing 220a (the second juicing hole 2301) is finally discharged, through the sludge compressing force generator. The sludge compressing force generator has the end of the main housing 220a, but may be formed in the rim direction of the stepped part to give the resistance against the transferring force.

As illustrated in FIGS. 3 and 4, the discharge housing 240 may be provided at the longitudinal end of the juicing housing part 230. One end (rear end) of the discharge housing 240 may be coupled to the juicing housing part 230, and the other end (front end) side thereof may be provided with the accommodating part 241. The accommodating part 241 is provided at a position which is spaced at a predetermined distance in the longitudinal direction apart from one end (rear end) of the discharge housing 240 coupled to the juicing housing part 230.

The extension 264, which is provided at any one end of the first juicing roller 261 and the second juicing roller 265 accommodated in the juicing housing part 230, may extend to protrude forward from the end of the juicing housing part 230 and may be inserted into and supported by the accommodating part 241 through a part of the discharge housing 240 coupled to the juicing housing part 230.

More specifically, the extensions 264, which are provided at the respective ends of the first juicing roller 261 of the first gear roller 281 and the second juicing roller 265 of the second gear roller 282, may be configured so that a first extension 264 of the first juicing roller 261 and a second extension 264 of the second juicing roller 265 are rotatably inserted into and supported by two support through holes which are provided in the accommodating part 241 in the width direction, respectively.

The discharge housing 240 may have an opening formed downward between one end coupled to the juicing housing part 230 and the accommodating part 241, so that the sludge, which is the residue of the juicing material after the juicing material is juiced, is discharged. Hereinafter, the description by defining, as 'discharge direction', the direction in which the sludge is discharged in a longitudinal direction of the main housing 200a.

As illustrated in FIGS. 4 and 5, the juicing solution discharge guider 231 is formed integrally with the discharge housing 240, as described above, and is formed to be inclined downward from the rear coupled to the juicing housing part 230 and positioned under the juicing housing part 230. Accordingly, a part of the juice which is juiced by the juicing roller part 260 and discharged through the second juicing hole 2301 falls to the juicing solution discharge guider 231 to flow downward.

Figure 6:
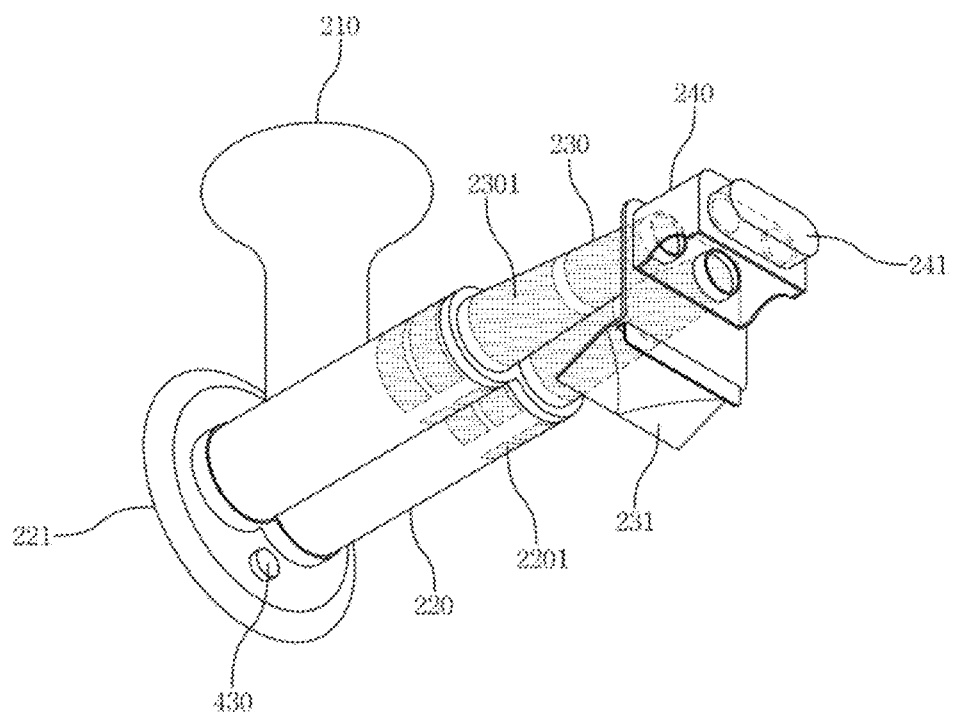
FIG. 6 is a perspective diagram illustrating a state where a sensor operating means is provided in a housing 200a according to an embodiment of the present disclosure.
Figure 7:
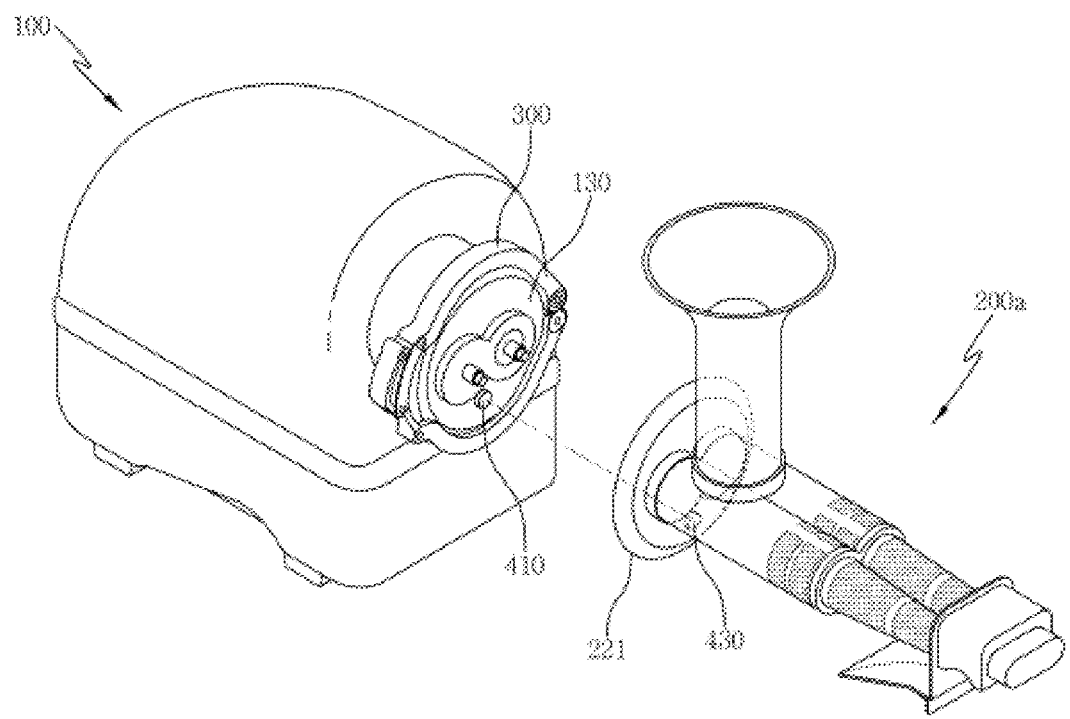
FIG. 7 is a perspective diagram illustrating for explaining a coupling process between a drive part 100 and the housing 200a according to an embodiment of the present disclosure.
Figure 8:
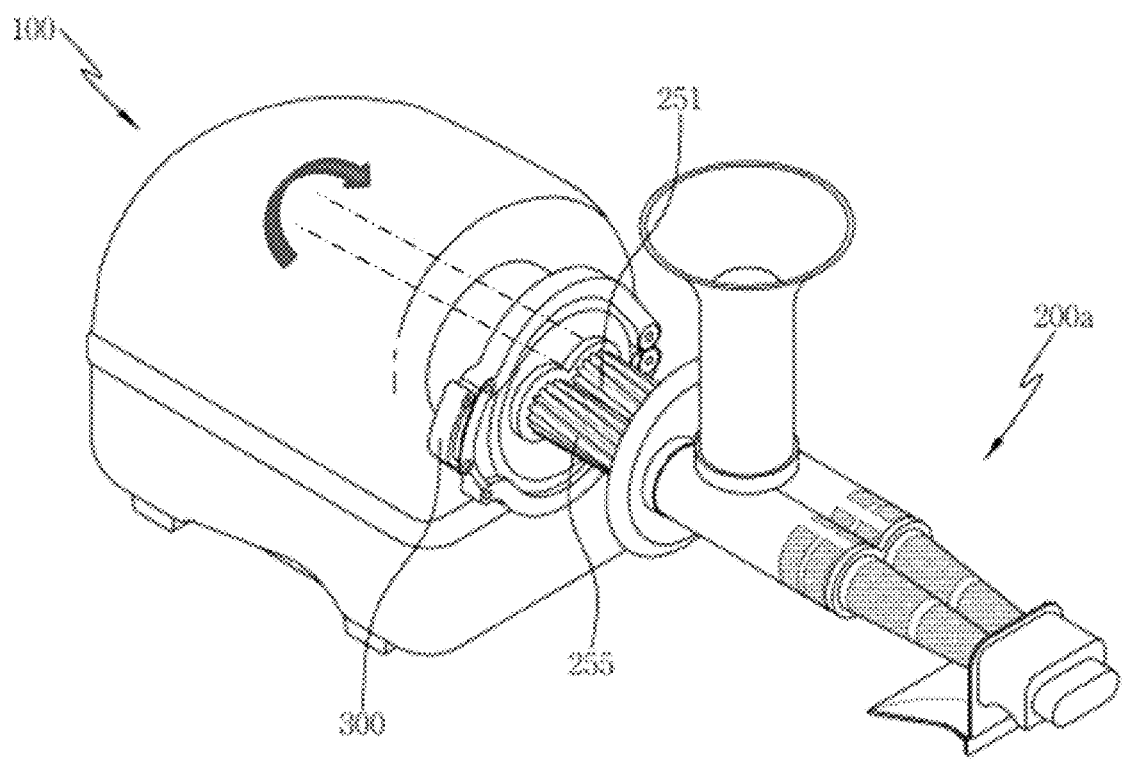
FIGS. 8 and 9 are perspective diagrams illustrating a process of attaching and detaching the drive part 100 and the housing 200a of the juicer according to an embodiment of the present disclosure.
Figure 9:
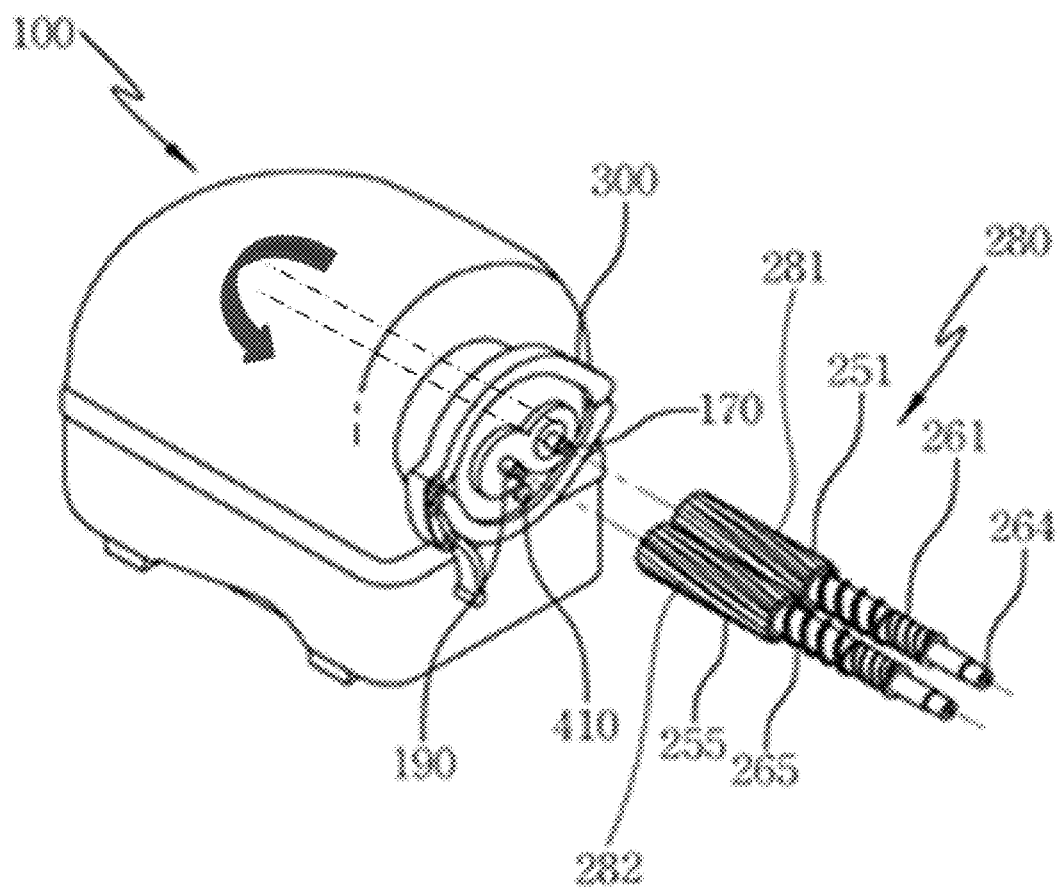

FIG. 6 is a perspective diagram illustrating a state where a sensor operating means is provided in the housing 200a according to an embodiment of the present disclosure, FIG. 7 is a perspective diagram illustrating for explaining a coupling process between the drive part 100 and the housing 200a according to an embodiment of the present disclosure, and FIGS. 8 and 9 are diagrams illustrating a state where the drive part and the roller part of the juicer according to an embodiment of the present disclosure are detached.

A sensor part 400 is provided in the drive part 100 and the juicing part 200 according to the present disclosure, and the sensor part 400 may include a sensor 410 which is provided at one side of the first connecting part 130 of the motor housing 110, and a sensor operating part 430 which is provided in a second connecting part 221 of the housing 200a. As the sensor part 400, for example, various types of proximity sensors may be used, which operate depending upon whether an object approaches another object, such as a magnetic proximity sensor, an optical proximity sensor, or an ultrasonic proximity sensor.

Here, describing the use of the magnetic proximity sensor, the sensor 410 in the present disclosure may be a reed switch operated by a magnet, and the sensor operating part 430 may be a permanent magnet.

The sensor 410 may become an 'ON' state when approaching the sensor operating part 430, and may become an 'OFF' state when moving away from the sensor operating part 430. The sensor 410 may be provided on a path of connecting a motor with a power source. When the juicing part 200 is coupled to the drive part 100 through the fastening part 300, the sensor 410 and the sensor operating part 430 are provided to face in proximity to each other, such that the sensor 410 becomes an 'ON' state, and when a switch not illustrated is turned on, power is supplied to the motor 150 to drive the motor 150, and the first grinding roller 251, the second grinding roller 255, the first juicing roller 261, and the second juicing roller 265 may rotate within the housing 200a through the rotary shaft 170.

According to the present disclosure, the motor 150 may be automatically turned on/off according to the operating states of the sensor part 400 and the sensor operating part 430 of the motor housing 110. That is, when the sensor 410 approaches the sensor operating part 430 and becomes an 'ON' state, the motor 150 automatically becomes the 'ON' state to operate, and when the sensor 410 moves away from the sensor operating part 430 and becomes an 'OFF' state, the motor 150 becomes an 'OFF' state to automatically stop.

Furthermore, the motor 150 may be operated/stopped by the sensor part 400 and the sensor operating part 430, and the drive part 100 and the roller part 280 are mutually attachable to and detachable from each other by the normal and reverse rotation of the motor 150. That is, as illustrated in FIGS. 8 and 9, when the roller part 280 is coupled to the drive part 100, the motor 150 may be rotated normally such that the roller part 280 and the drive part 100 are tightly fastened to each other, and when the roller part 280 prepares to be separated from the drive part 100, the motor 150 may be rotated reversely such that the roller part 280 and the drive part 100 are released from being coupled to each other.

According to the present disclosure, the motor 150 may be operated and stopped by the sensor part 400 and the sensor operating part 430 and the operations of the motor 150 may be controlled through the controller (not illustrated). That is, a separation distance between the roller part 280 and the drive part 100 is sensed by the sensor part 400 and the sensor operating part 430, such that the operation/stop of the motor 150 may be prepared and in conjunction therewith, the motor 150 may be normally or reversely rotated automatically or manually through the controller and the roller part 280 may be attached and detached from the drive part 100.

Specifically, as described above, when the sensor 410 approaches the sensor operating part 430 and becomes the 'ON' state, the motor 150 automatically becomes the 'ON' state according to a signal of the controller to operate. At this time, when the user couples the roller part 280 with the drive part 100, the motor 150 is rotated normally by an operating signal of the controller, such that the roller part 180 may be tightly coupled to the drive part 100. Conversely, when the sensor 410 moves away from the sensor operating part 430 and becomes the "OFF" state, the motor 150 may become the "OFF" state to automatically stop. At this time, when the user wants to separate the roller part 280 from the drive part 100, the motor 150 is reversely rotated by the operating signal of the controller, such that the roller part 180 may be removed from the drive part 100 more easily.

Accordingly, by controlling, by the controller, the motor 150 to be normally and reversely rotated automatically or manually, the controller controlling the operation of the motor 150 according to the proximity distance between the sensor 410 and the sensor operating part 430 and the attachment and detachment of the roller part 280 to and from the drive part 100, it is possible to fundamentally prevent safety accidents capable of occurring when the user detaches the roller part 280 from the drive part 100.

As described above, the embodiment of the juicer with improved juicing performance according to the present disclosure has been described in detail with reference to the accompanying drawings. However, the embodiment of the present disclosure is not necessarily limited to the aforementioned embodiment, and it is natural that various modifications and equivalents thereof may be made by those skilled in the art to which the present disclosure pertains. Accordingly, the true scope of the present disclosure will be defined by the claims to be described later.

The invention claimed is:

1. A juicer with improved safety comprising:
   a motor housing;
   a drive part comprising a motor which is provided inside the motor housing, wherein the drive part is provided with a sensor operating part;
   a roller part which is detachably coupled to the motor housing and extending forward therefrom, and to be rotatably driven by a driving force which is transferred from the drive part; and
   a sensor part composed of a sensor which is operated by a change in a distance from the sensor operating part, wherein a roller part housing comprising the roller part comprises the sensor part;
   wherein the motor is configured to be controlled according to a signal generated based on the change in the distance between the sensor and the sensor operating part and an attachment and detachment of the roller part to the drive part,
   wherein the drive part and the roller part are mutually attached and detached by normal and reverse rotation of the motor,
   wherein, when the sensor operating part approaches the sensor, the motor is in an "ON" state, and when the roller part is coupled to the drive part when it is in the "ON" state, the motor rotates forward according to an operation signal and the roller part is coupled to the drive part,
   and when the sensor operating part moves away from the sensor and becomes the "OFF" state, the motor automatically becomes the "OFF" state according to the operating signal, and when in the "OFF" state, the roller part rotates in reverse according to the operation signal and is separated from the drive part,
   wherein the motor is automatically rotated normally if a fastening completion signal is received after the roller part is fastened to the drive part, and the motor is automatically rotated reversely if a juicing completion signal is received after the driving of the roller part is terminated such that the roller part is separated from the drive part, and
   wherein the motor is capable of rotating both in normal and reverse directions, and the motor operates with a smaller output during the normal rotation than during the reverse rotation.

2. The juicer of claim 1,
   wherein the roller part comprises:
   a first gear roller which is connected to a rotary shaft of the driver part and gradually decreases in outer diameter in a discharge direction of sludge; and
   a second gear roller which is connected to a fixed shaft of the drive part and gradually decreases in outer diameter in the discharge direction of the sludge.

3. The juicer of claim 1, further comprising a sludge compressing force generator which generates a compressing force to sludge before a juicing material which is transferred between the outer surface of the roller part and the inner surface of the main housing is finally discharged.

4. The juicer of claim 3,
   wherein the sludge compressing force generator is provided at the end of the main housing, and is provided to be formed in a rim direction of a stepped part to give a resistance against a transferring force of the sludge, the stepped part being formed to be stepped between the sludge compressing force generator and an extension protruding from the front end of the roller part.

* * * * *